United States Patent [19]

Fulwiler

[11] 4,077,830

[45] Mar. 7, 1978

[54] LAMINATE AND METHOD FOR PROTECTING PHOTOGRAPHIC ELEMENT

[75] Inventor: Stanley S. Fulwiler, Hilton, N.Y.

[73] Assignee: Tapecon, Inc., Rochester, N.Y.

[21] Appl. No.: 652,881

[22] Filed: Jan. 27, 1976

Related U.S. Application Data

[60] Continuation of Ser. No. 504,093, Sep. 9, 1974, abandoned, which is a division of Ser. No. 307,093, Nov. 16, 1972, abandoned, which is a continuation of Ser. No. 88, 755, Nov. 12, 1970, abandoned, and a continuation of Ser. No. 504,137, Sep. 9, 1974, abandoned, which is a continuation of Ser. No. 307,093, Nov. 16, 1972, abandoned, which is a continuation of Ser. No. 88,755, Nov. 12, 1970, abandoned.

[51] Int. Cl.[2] .................... B32B 31/00

[52] U.S. Cl. .................... 156/249; 96/50 PL; 96/89; 156/309; 428/40; 428/332; 428/335; 428/354; 428/906; 428/913; 428/918

[58] Field of Search .................... 428/40, 409, 906, 918, 428/913, 354, 332, 335; 96/89, 351, 50 PL; 156/230, 238, 249, 309; 53/28

[56] References Cited

U.S. PATENT DOCUMENTS

| | | | |
|---|---|---|---|
| 2,940,884 | 6/1960 | White | 428/41 |
| 3,087,850 | 4/1963 | Cole | 156/324 |
| 3,140,572 | 7/1964 | Petersen et al. | 53/28 |
| 3,301,741 | 1/1967 | Henrickson et al. | 428/40 |
| 3,397,980 | 8/1968 | Stone | 96/50 |
| 3,469,982 | 9/1969 | Celeste | 96/35.1 |
| 3,526,504 | 9/1970 | Celeste | 96/35.1 |
| 3,540,977 | 11/1970 | Schickedanz | 428/409 |
| 3,547,730 | 12/1970 | Cohen et al. | 156/345 |
| 3,690,909 | 9/1972 | Finley | 428/40 |

*Primary Examiner*—George F. Lesmes
*Assistant Examiner*—S. S. Silverman

[57] ABSTRACT

A laminate having particular characteristics is used in securing a protective sheet over the emulsion surface of a photographic element such as negatives, positives, slides, glass plates, microfilm, movie film, etc. The optical and mechanical characteristics of the laminate include a protective sheet of transparent, wear-resistant plastic coated with a pressure-sensitive adhesive so that the total thickness of the protective sheet and the adhesive is less than 0.004 inches. The adhesive transmits a major portion of incident ultra violet light and is non-degradable in ultra violet light, and a release sheet of resin material covers the adhesive coating until application to the photographic element when the release sheet is stripped away. Both the protective sheet and the release sheet have a surface finish of less than 10-millionths of an inch RMS so that both the adhesive surface and the protective sheet surface are very smooth when the release sheet is stripped away.

4 Claims, 2 Drawing Figures

LAMINATE AND METHOD FOR PROTECTING PHOTOGRAPHIC ELEMENT

RELATED APPLICATIONS

This is a continuation of my copending application Ser. No. 504,093, filed Sept. 9, 1974, entitled LAMINATE FOR PROTECTING PHOTOGRAPHIC ELEMENT (abandoned upon the filing of this continuation application) which was a divisional of application Ser. No. 307,093, filed Nov. 16, 1972, entitled PHOTOGRAPHIC ELEMENT PROTECTION SYSTEM, which in turn was a continuation of application Ser. No. 88,755, filed Nov. 12, 1970, entitled PHOTOGRAPHIC ELEMENT PROTECTION SYSTEM.

This is also a continuation of my copending application Ser. No. 504,137, filed Sept. 9, 1974, entitled PHOTOGRAPHIC ELEMENT PROTECTION SYSTEM (abondoned upon the filing of this continuation application) which was a continuation of application Ser. No. 307,093, filed Nov. 16, 1972, which in turn was a continuation of application Ser. No. 88,755, filed Nov. 12, 1970, both entitled PHOTOGRAPHIC ELEMENT PROTECTION SYSTEM.

All the previous applications are now abandoned.

THE INVENTIVE IMPROVEMENT

Photographic elements used in industrial processes such as etching electronic printed circuits, chemically milling parts, making printing plates, and storing information, suffer many forms of damage. They can be scratched, abraded, cut, etched, obscured with oils or other materials, or have particles imbedded in their surfaces in the course of their use. Such damage can affect their optical properties so that the resulting work is defective, and the damage can be costly because such photographic elements are expensive to replace.

The need has long been recognized for a protective coating over such photographic elements, and particularly over their relatively soft emulsion surfaces, and many attempts have been made to accomplish this. However, the solution is not easy, and before this invention, no products were available that satisfied the optical and mechanical requirements.

The invention proposes a photographic element protection system that does work, and the invention involves analysis of the optical and mechanical requirements for a successful photographic element protector, and selecting the correct materials and conditions for meeting these requirements. The invention also aims at simplicity, economy, and ease of application of a rugged and durable protector.

SUMMARY OF THE INVENTION

The inventive system uses a protective sheet having a pressure sensitive adhesive coating securing it to the emulsion surface of a photographic element, the adhesive being covered by a release sheet before application to the photographic element. Conventional laminates of a sheet material coated with a pressure-sensitive adhesive covered by a release are generally known, but are unsatisfactory for covering photographic elements used in printing processes. They would be too thick, not optically clear enough, not smooth enough, and they would degrade in the ultra violet light often used for industrial photographic work. These deficiencies would cause optical distortions and errors and an unreasonably short working life. Hence, such laminates would normally be rejected as a possible solution to the photograph protecting problem.

The inventive laminate has special characteristics that do meet the optical and mechanical requirements for a photographic element protector, however. The protective sheet is formed of a transparent resin material that is relatively wear-resistant, and the total thickness of the protective sheet and the adhesive coating is less than 0.004 inches. The protective sheet also has a surface finish of less than 10-millionths of an inch RMS for optical clarity. The adhesive transmits a major portion of incident ultra violet light and is non-degradable in ultra violet light which attacks many conventional adhesives. The release sheet is formed of a resin material rather than paper, and has a surface finish of less than 10-millionths of an inch RMS to give the adhesive coating a corresponding surface finish when the release sheet is stripped away from the adhesive coating. These conditions make the protective sheet and the adhesive coating sufficiently smooth, thin, and transparent so that it can be applied to the emulsion surface of a photographic element without causing substantial distortion or error.

DRAWINGS

FIG. 1 is a partially schematic, cross-sectional view of a fragment of a preferred laminate for use in the inventive system; and FIG. 2 is a schematic view of the application of the laminate of FIG. 1 to a photographic element according to the inventive system.

DETAILED DESCRIPTION

Figure 1:
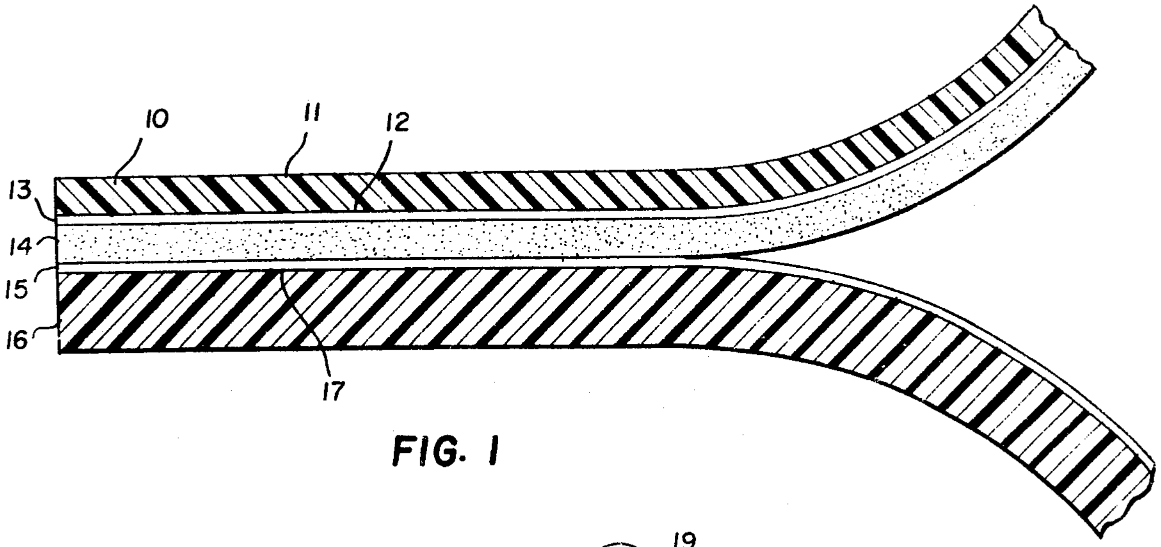

Transparent resin materials such as polyester resins in clear sheet form offer many advantages in protecting a photographic surface. Materials such as DuPont's MYLAR have many desirable properties as a photographic element protector if the MYLAR could be fastened to the photographic element uniformly all over its surface. This is necessary to prevent optical distortion from irregularities in the interface between the protective sheet and the photographic element. An ordinary pressure-sensitive adhesive coating on such a sheet does not solve the uniform adherence problem.

If a pressure-sensitive adhesive coating is to be used, it is desirable to coat the adhesive on a thin protective sheet in advance of use, and to protect the adhesive coating with a release sheet that is stripped away just before pressing the adhesive against the photographic element. Such release sheets are conventionally formed of paper that is coated with a primer so that it will release readily from the adhesive coating.

It was recognized in the inventive analysis of the photographic element protecting problem that pressure-sensitive adhesives are extremely viscous fluids that conform slowly to the surface characteristics of whatever surfaces they contact. A uniform thickness of adhesive on a hard surface of high finish will not flow even under pressure, because the high surface finish preduces no irregularities for the adhesive to conform to. However, paper has a relatively rough surface, and the pressure applied to an adhesive coating by a release paper when a laminate is wound into a roll causes the adhesive to flow relative to the irregularities in the paper surface to equalize the pressure. The adhesive will lie thick over the valleys in the paper surface and thin over the paper hilltops to have a relatively rough and irregular surface corresponding to the paper surface. When the release is stripped away, the adhesive retains the irregular imprint of the paper and presents a relatively rough outer surface to the photographic element. This rough surface and the associated differences in thickness of the adhesive coating cause optical distortions in printing processes using the photographic element.

To overcome this problem, a laminate used in the inventive system has a release sheet formed of a resin material having a high surface finish so that the adhesive coating is smooth and even when the release sheet is stripped away. The surface finish of the release sheet and the protective sheet are each preferably less than 10-millionths of an inch RMS and preferably about 4-millionths of an inch RMS. This normally requires casting of such sheet material on a casting wheel having a correspondingly high surface finish. Such a requirement for a release sheet is uniquely novel, and yet it produces the high surface finish desired for the adhesive coated protective sheet applied to the photographic element. The interface between the adhesive coating and the protective sheet is uniform, continuous, and highly smooth because of the high surface finish of the protective sheet, and the opposite face of the protective sheet has the same smooth surface finish. The face of the adhesive coating pressed against the photographic element also has a high surface finish to avoid optical distortion from uneven thickness. When other requirements of the protective sheet and adhesive coating are also met, the system becomes feasible for protecting photographic elements used in printing processes.

Some of the other requirements include that the protective sheet be relatively thin, tough, wear-resistant, and transparent to ultra violet light. The protective sheet is preferably no more than 0.002 inches thick, and is preferably 0.001 inches or less in thickness. Also, the adhesive coating is preferably 0.001 inches or less in thickness, and the total thickness of the protective sheet and the adhesive is 0.004 inches or less.

Many conventional adhesives absorb ultra violet light and degrade in ultra violet light to discolor and lose their adhesive capacity. Adhesives suitable for use in the inventive system transmit a major portion of incident ultra violet light and are not degradable in ultra violet light. From among the few adhesives that meet these requirements, acrylic adhesives are preferred.

A preferred laminate for use in the inventive system is shown schematically in FIG. 1 where the protective sheet 10 is preferably formed of DuPont's MYLAR and is preferably not more than 0.001 inches thick. Both surfaces 11 and 12 of sheet 10 have a surface finish of less than 10-millionths of an inch RMS.

A primer coating 13 on surface 12 of sheet 10 insures a secure bonding of pressure sensitive adhesive coating 14 to sheet 10. Adhesive layer 14 is preferably no more than 0.001 inches thick, and is preferably an acrylic adhesive that transmits a major portion of ultra violet light and is not degradable in ultra violet light.

A release coating 15, preferably silicone, on release sheet 16 insures release sheet 16 from adhesive 14 as shown in FIG. 1. Release sheet 16 is preferably a polyester resin material with a surface 17 having a finish of less than 10-millionths of an inch RMS to present a highly smooth face to adhesive coating 14.

Figure 2:
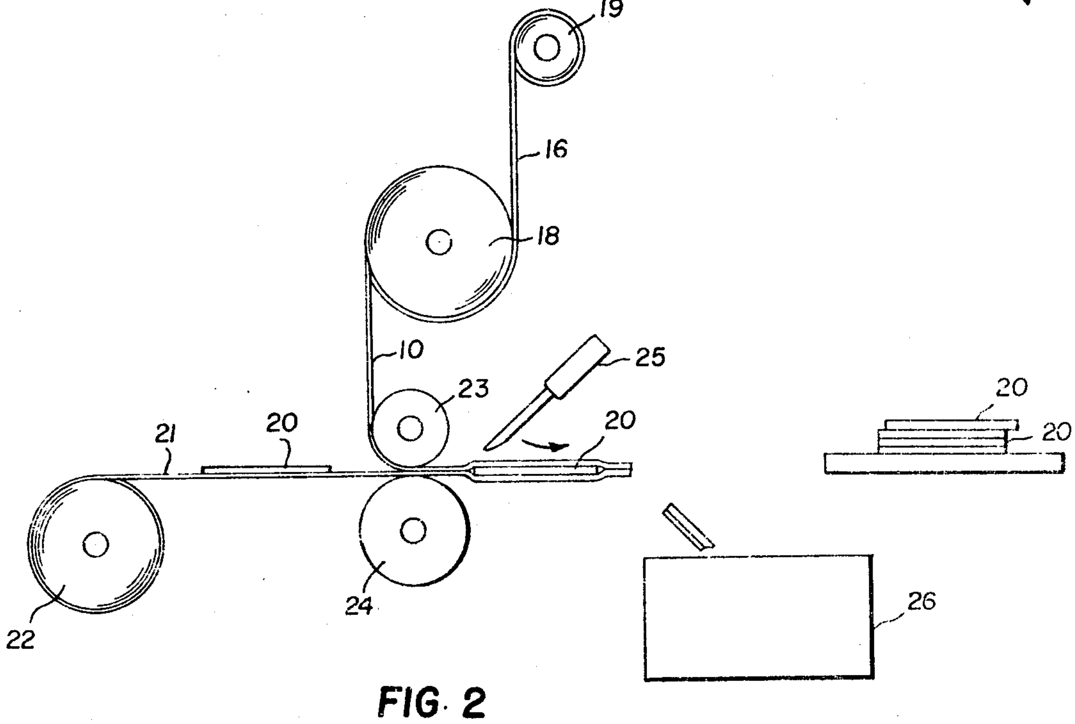

As shown in FIG. 2, a supply roll 18 of the laminate of FIG. 1 is arranged so that a take-up roll 19 strips away release sheet 16 so adhesive-coated protective sheet 10 can be applied to a photographic element 10. Photographic element 20 is placed on a carrier strip 21 that is unwound from a supply roll 22 to move photographic element 20 between pressure roll 23 and backup roll 24 for pressing adhesive coated sheet 10 to the emulsion surface of photographic element 20. Sheet 10 is also pressed to carrier sheet 21 around the edges of photographic element 20, and the borders of photographic element 20 are trimmed as schematically represented by knife 25. Protective-covered photographic elements 20 are then ready for use, and the trimmed-away portions of sheet 10 and carrier strip 21 are discarded to waste bin 26 as indicated. Strip 21 is conveniently formed of paper for such purpose, but could also be formed of other materials or arranged as an endless belt.

The protective sheet according to the invention can be applied to both faces of the photographic element if desired, and can be applied to other surfaces where needed. Many variations of the equipment schematically represented in FIG. 2 can be used in applying the protective sheet, or the sheet can be applied manually.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but fallng within the spirit of the invention. For example, those skilled in the art will know of many materials that can be combined according to the invention to produce a workable result, and they will appreciate the many circumstances in which the high precision of the inventive system is advantageous.

I claim:

1. A protective, optically clear laminate formed of a thin, protective sheet of transparent resin material having a thin coating of transparent, pressure-sensitive adhesive covered by a release sheet, said laminate being wound in a roll before use and said laminate being used by removing said release sheet and pressing said adhesive against the emulsion surface of a photographic element having a developed image to preserve the optical properties of said image of said photographic element during a period when said photographic element is in use for contact printing, said laminate being characterized by:

a. both surfaces of said protective sheet having a surface finish of less than 10-millionths of an inch RMS;

b. said release sheet being formed of resin material with both surfaces having a surface finish of less than 10-millionths of an inch RMS;

c. the surface of said adhesive coating that is exposed when said release sheet is stripped away having a surface finish conforming to said release sheet and being less than 10-millionths of an inch RMS;

d. said exposed surface of said adhesive having said surface finish of less than 10-millionths of an inch RMS being in contact with said emulsion surface of said photographic element when said laminate is in use; and e. the total thickness of said protective sheet and said adhesive being less than 0.002 inches.

2. The laminate of claim 1 wherein said adhesive transmits a major portion of incident ultra-violet light and is substantially non-degradable in ultra-violet light.

3. A method of protecting the emulsion surface of a photographic element having a developed image to preserve the optical properties of said image of said photographic element during a period when said photographic element is in use for contact printing, said method comprising:

a. selecting and acquiring a thin, protective sheet of transparent resin material having a surface finish of less than 10-millionths of an inch RMS and being less than 0.001 inches thick;

b. selecting and acquiring a transparent, pressure-sensitive adhesive capable of bonding said protective sheet to said emulsion surface;

c. coating a thin layer of said adhesive on said protective sheet so said layer is less than 0.001 inches thick;

d. selecting and acquiring a resin release sheet having a surface finish of less than 10-millionths of an inch RMS;

e. covering said adhesive layer with said resin release sheet;

f. smoothing said adhesive layer by winding up said adhesive-coated protective sheet and said release sheet so the surface of said adhesive layer contacting said release sheet is pressed against said release sheet to conform to said release sheet and acquire a surface finish of less than 10-millionths of an inch RMS;

g. unwinding said adhesive-coated protective sheet and said release sheet;

h. stripping said release sheet away from said adhesive-coated protective sheet to expose said adhesive surface having a finish of less than 10-millionths of an inch RMS;

i. pressing said adhesive layer against said emulsion surface to secure said protective sheet to said photographic element; and j. said selection and acquisition of said protective sheet, said adhesive, and said release sheet with said surface finish giving said adhesive layer said surface finish all cooperating to form a substantially distortion-free optical path from said emulsion surface through said adhesive and said protective sheet so said image of said photographic element can be used for contact printing with said protective sheet in place preventing damage to said emulsion surface.

4. The method of claim 3 including selecting said adhesive for transmitting a major portion of incident ultra-violet light and for being substantially non-degradable in ultra-violet light.

* * * * *